US007716573B2

(12) United States Patent
Schwartz

(10) Patent No.: US 7,716,573 B2
(45) Date of Patent: May 11, 2010

(54) METHOD AND SYSTEM FOR BROADLY SHARING UML-BASED MODELS

(75) Inventor: David R. Schwartz, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 1260 days.

(21) Appl. No.: 11/237,497

(22) Filed: Sep. 28, 2005

(65) Prior Publication Data

US 2007/0074178 A1    Mar. 29, 2007

(51) Int. Cl.
G06F 17/00 (2006.01)
(52) U.S. Cl. .................. 715/234; 707/10; 709/246; 717/101; 717/104; 717/105
(58) Field of Classification Search .................. 715/234, 715/239
See application file for complete search history.

(56) References Cited

U.S. PATENT DOCUMENTS

| 6,330,569 | B1 | 12/2001 | Baisley et al. | |
|---|---|---|---|---|
| 6,550,054 | B1 | 4/2003 | Stefaniak | |
| 6,889,360 | B1 | 5/2005 | Ho et al. | |
| 2004/0143583 | A1 | 7/2004 | Poole et al. | |
| 2005/0060317 | A1* | 3/2005 | Lott et al. | 707/10 |
| 2006/0059115 | A1* | 3/2006 | Gutfleisch et al. | 707/1 |
| 2006/0064667 | A1* | 3/2006 | Freitas | 717/104 |

OTHER PUBLICATIONS

MacKinnon, et al., Designing UML Diagrams for Technical Documentation: Continuing the Collaborative Approach to Publishing Class Diagrams, SIGDOC '04, Oct. 2004, pp. 120-126, Memphis, TN.
Routledge, et al., UML and XML Schema, Thirteenth Australasian Database Conference (ADC2002), 2002, pp. 157-166, Melbourne, Australia.
Song, et al., Designing and Developing an Automtic Interactive Keyphrase Extraction System with Unified Modeling Language (UML), Proceedings of the 67$^{th}$ ASIS&T Annual Meeting, 2004, pp. 367-372, Medford, NJ.
Suzuki, et al., Managing the Software Design Documents with XML, ACM Special Interest Group for Design of Communication Proceedings of the 16th Annual International Conference on Computer Documentation, SIGDOC, 1998, ACM Digital Library, pp. 127-136, Quebec, Canada.

* cited by examiner

*Primary Examiner*—Doug Hutton
*Assistant Examiner*—Quoc A Tran
(74) *Attorney, Agent, or Firm*—Dillon & Yudell LLP

(57) ABSTRACT

A method, system and computer-usable medium is based on a procedure that includes: generating a graphics file for each of a plurality of Unified Modeling Language (UML) diagrams; creating an Extensible Markup Language (XML) schema that reflects an underlying subject domain that is to be used when creating an XML representation of one or more UML models that incorporate relationships described by the UML diagrams; converting each of the UML models into an XML file using the XML schema, wherein the XML file includes XML formatted written descriptions of attributes of elements represented in the UML models; and transforming the XML file into multiple HyperText Markup Language (HTML) files, wherein the HTML files include written descriptions of attributes of and relationships among elements represented in the UML models.

15 Claims, 16 Drawing Sheets

DESCRIPTION

Candidate offering(s) evaluated thoroughly and objectively

RELATIONSHIPS

Role associations
    Technical decision maker
    Technical manager

May depend on achieving the following goals:
    Aware of other users experiences
    Aware of what other trusted experts say
    Education and training available as needed Parents Children

MEASURES

Product names and descriptions easily understood
Program names and descriptions easily understood

DIAGRAMS ON WHICH THIS ITEM APPEARS

IT Support - Preventing and resolving IT problems user goals
Learning about offerings in order to evaluate them user goals
Purchasing user goals
Relationship - Managing account relationships user goals
Relationship - Marketing and selling user goals Relationship - Training and certification user goals
Role to goal for solutions research
Role to goal solution lifecycle

SOURCES AND REQUIREMENTS

User Study 2 Final Report
Best solution researched and identified

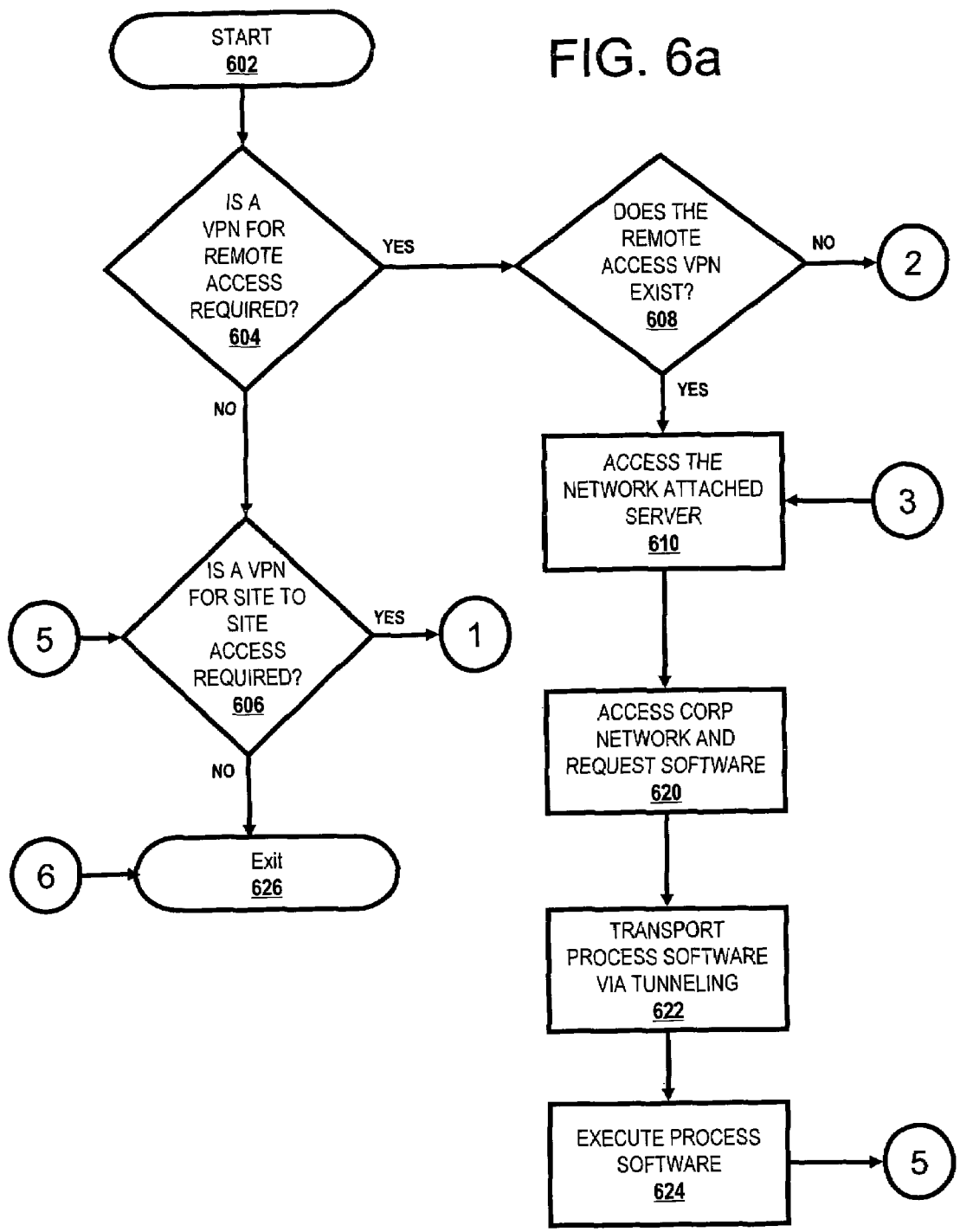

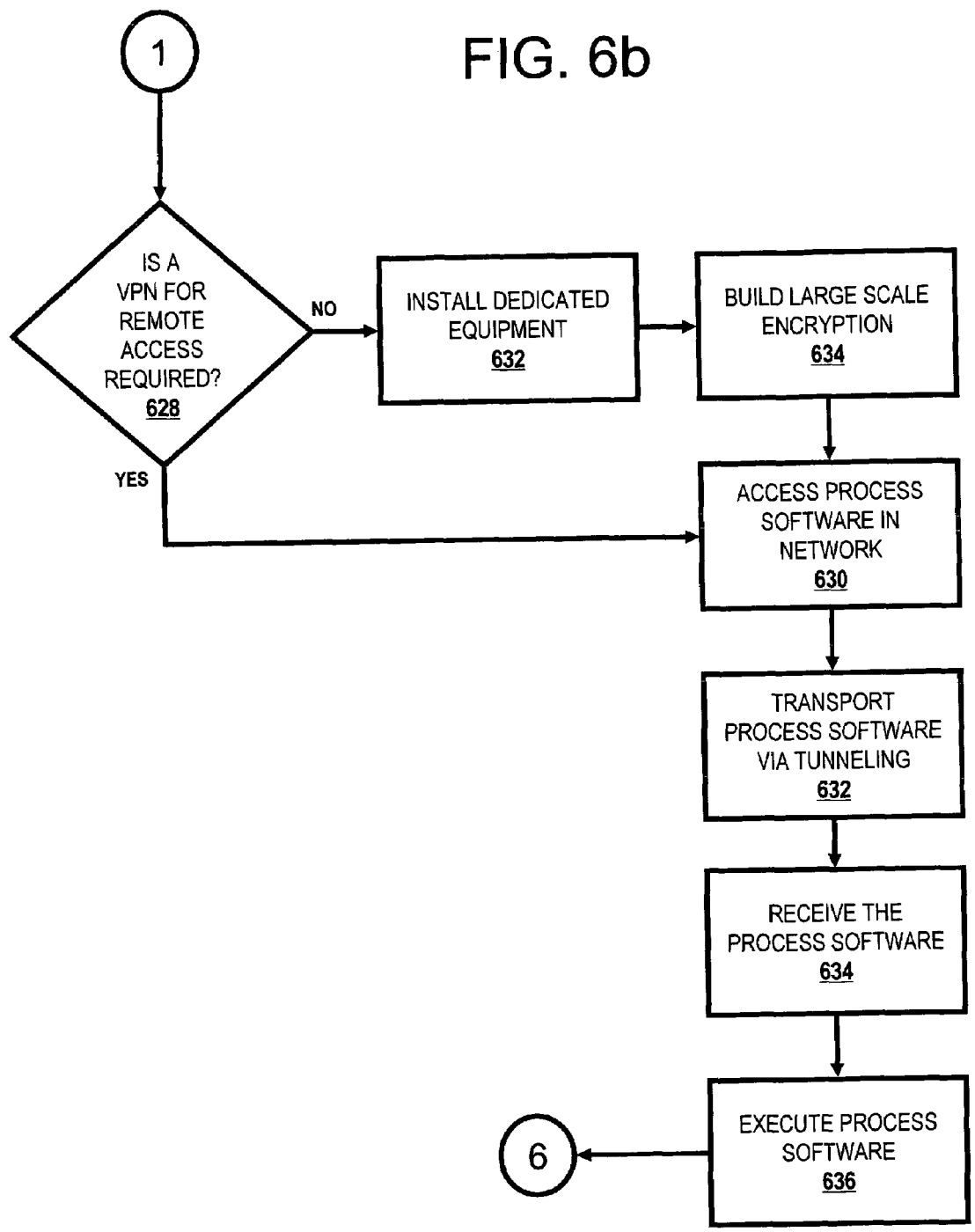

METHOD AND SYSTEM FOR BROADLY SHARING UML-BASED MODELS

BACKGROUND OF THE INVENTION

1. Technical Field

The present invention relates in general to the field of computers and similar technology systems, and in particular to software utilized by such systems to implement methods and processes. Still more particularly, the present invention relates to a computer-implementable method and system for communicating a UML model in a manner that reflects a particular subject domain.

2. Description of the Related Art

Unified Modeling Language (UML) has quickly become universally accepted as a preferred modeling language in software development. UML is a graphical language that includes annotated nodes and arcs among nodes that represent relationships. A UML model typically includes numerous diagrams that contain these elements, which represent different aspects of a subject domain (e.g., an area of interest within a particular enterprise) being modeled. UML artifacts include use case diagrams, class diagrams, sequence diagrams, statechart diagrams, activity diagrams, component diagrams and deployment diagrams.

These models and diagrams have become standard software development work products that are often provided to non-technical individuals, who are otherwise knowledgeable of the subject domain being modeled, and who must then evaluate the UML-based models. Unfortunately, these individuals, not being Information Technology (IT) specialists, are unable to interpret the UML models/diagrams easily.

SUMMARY OF THE INVENTION

Recognizing the need for an enterprise's manager to understand and utilize information found in a UML model, the present invention presents a method, system and computer-usable medium to assist in a UML model's interpretation based on a procedure that includes: generating a graphics file (such as a JPEG file) for each UML diagram; creating an Extensible Markup Language (XML) schema that reflects the underlying subject domain to be used while creating an XML file that represents a UML model that incorporates relationships described by one of the UML diagrams; converting the UML model into an XML file conforming to the XML schema, wherein the XML file includes XML formatted written descriptions of attributes of elements represented in the UML model; and transforming the XML file into HyperText Markup Language (HTML) files to create associated webpages, wherein the associated webpages include written descriptions of attributes of and relationships among elements that are represented in the UML model.

In one embodiment, the XML file is transformed into Formatting Objects that are then used to create a PDF file (or an RTF file). Both the HTML and PDF results reflect the underlying XML schema so that the non-technical audience can more easily understand the semantic content of the model. In essence, these results reflect the semantics of the subject domain without the unfamiliar syntax of UML.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 1c depicts an exemplary webpage that represents a goal a user has when using a system that is modeled using a UML syntax as a class with attributes;

FIGS. 6a-c show a flow-chart of steps taken to deploy in a Virtual Private Network (VPN) software that is capable of executing the steps shown and described in FIGS. 2a-b;

DETAILED DESCRIPTION OF THE PREFERRED EMBODIMENT

This invention presents a method and system for mining data from a UML-based model. In a preferred embodiment, Rational XDE® or other Rational® tools are used to model a subject domain (area of interest/curiosity about an enterprise). Rational SoDA® is then used to programmatically build an XML-based model conforming to an XML schema that reflects the subject domain. Modeling tools such as these export diagrams in JPEG format in support of their native HTML-based reporting. XSLT is then used to transform the XML into HTML and PDF files that reference the JPEG files, as appropriate, that reflect the underlying subject domain rather than UML syntax.

Figure 1A:
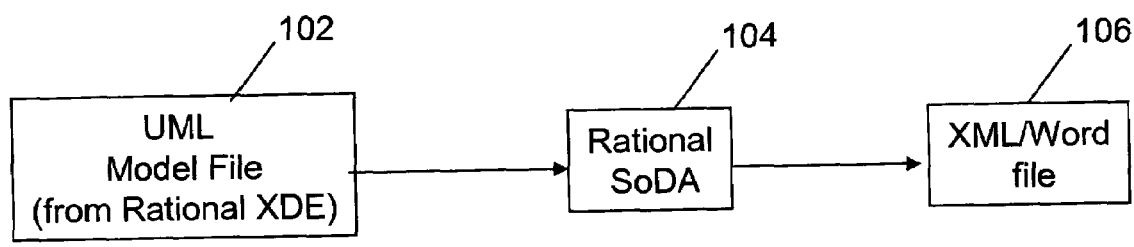
FIG. 1a shows a relationship between a source UML file and a Word target file using Rational SoDA.

With reference now to the figures, and in particular to FIG. 1a, there is depicted a block diagram of the interaction of Software Document Application (SoDA®) from Rational®, a division of International Business Machines (IBM®). Rational SoDA 104 is capable of extracting information from a Unified Modeling Language (UML) model file 102 (using, e.g., Rational Rose, Rational Software Modeler/Architect, or Rational's eXtended Development Environment—XDE) into a Microsoft Word® file 106. As will be described below, the XML/Word file 106 can be used to create an HTML-based webpage showing the diagram 108 shown in FIG. 1b. Additionally, data mined from the UML model file 102 can be used to generate webpages 110, shown in FIG. 1c, describing the different elements, including the names of diagrams in which they include and the relationships they have with other model elements, within the UML model file 102. The webpages 110 show, inter alia, relationships, goal measures, object attributes, role characteristics, operations, containing diagrams and original sources resulting from or otherwise involved in the methodology described in UML model file 102. Note that a UML model file 102 has no implicit awareness of goals, which are examples of subject domain semantics that are the primary interest of non-technical consumers of our UML model which might otherwise be obfuscated by the UML syntax.

Thus, FIG. 1c represents a goal a user has when using a system (semantic) that is modeled using the UML syntax as a class with attributes. That is, webpage 110 presents the goal 'Candidate offering(s) evaluated thoroughly and objectively', the relationships that exist to roles and other goals, measures used to determine whether the goal has been achieved, diagrams in which it is included and sources leading to the identification of the goal. These named headings reflect the semantics represented in the UML and about which any UML modeling tool is unaware.

Figure 2A:
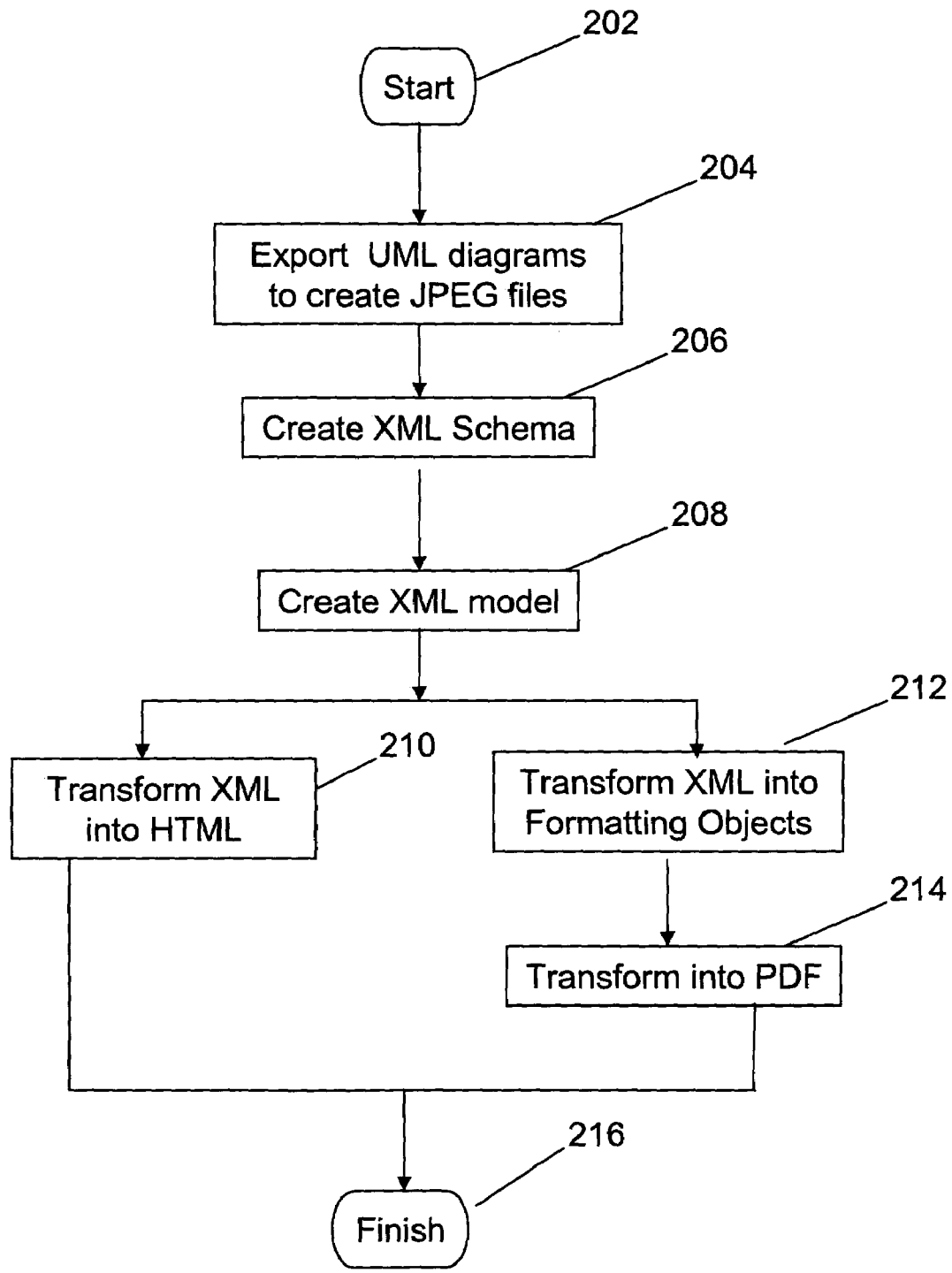
FIGS. 2a-b illustrate a flow-chart of exemplary steps taken to transform a UML file into JPEG, HTML and PDF files

With reference now to FIG. 2a, a flow-chart of exemplary steps taken in the present invention is presented. After initiator block 202, a UML diagram (file) is exported to create graphics files (e.g., Joint Photographic Experts Group (JPEG) files) that show the UML elements exactly as created (block 204). That is, the JPEG files show UML diagrams (including case, class, sequence, statechart, activity, component and deployment diagrams) just as they appear in a UML program. Of course, the JPEG files are not convertible into executable code such as C++. Nonetheless, the JPEG files contain useful information, including attributes of classes, relationships between actors and systems, etc.

Figure 2B:
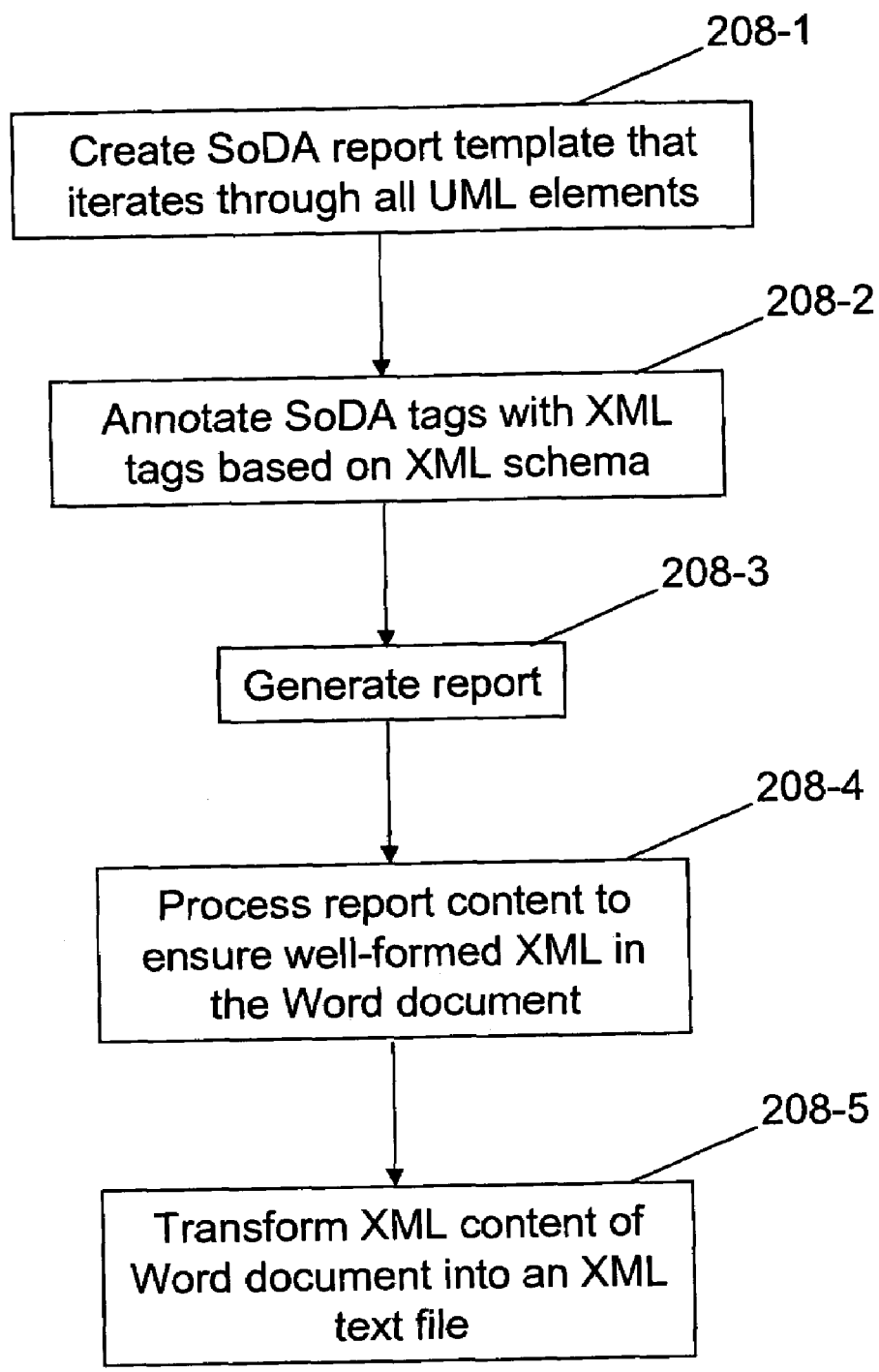

Next, an XML schema (grammatical rules) is created (block 206). This XML schema is used to guide the construction of an XML model (block 208). Details of block 208, showing how the XML model is constructed, are shown in FIG. 2b. First, a SoDA report template is created that iterates through all elements in the original UML model file (block 208-1). This report describes a template used by SoDA when converting the UML model file (e.g., using Rational XDE) into an XML/Word document. Next, SoDA tags in a SoDA report template are annotated with XML tags (block 208-2) based on the XML schema created in block 206. That is, using the SoDA template created in block 208-1, the SoDA tags are brought into conformance with XML tags found in the XML schema created in block 206. Based on the SoDA report template created in block 208-1, a report in Microsoft Word® format is generated (block 208-3). Using a checking program (e.g., custom created using Visual Basic or a similar Program), the content of the XML/Word document is processed to ensure that the XML language in the Word document is well-formed (block 208-4). The XML commands are then extracted from the Word document and placed into a true (executable) XML text file (block 208-5).

Figure 1B:
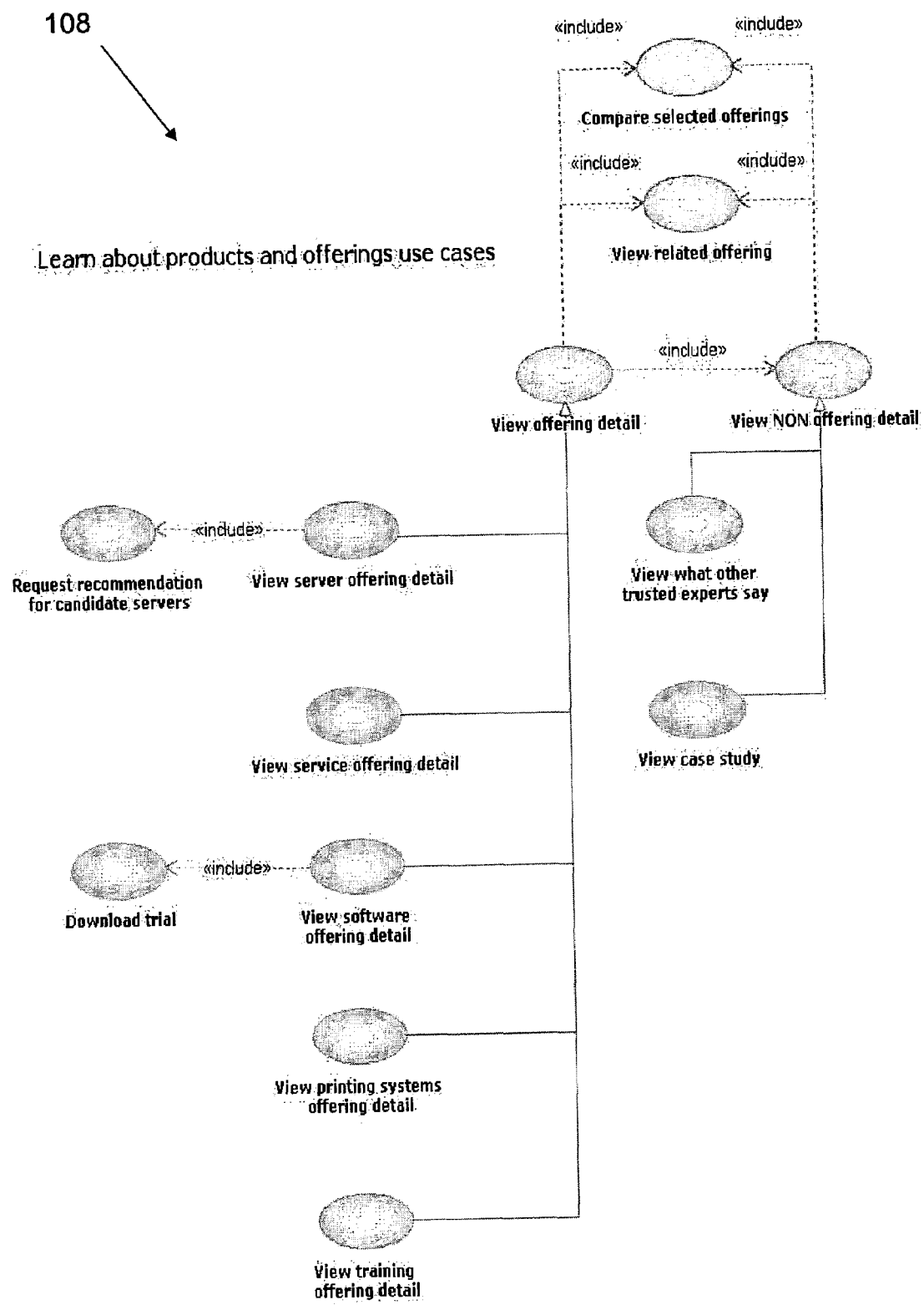
FIG. 1b illustrates a UML formatted diagram showing relationships among model elements.

Returning to FIG. 2a, the XML file can then be converted into an HTML file (block 210) to present webpages such as those shown in FIGS. 1b-c. Alternatively, the XML file can be transformed into formatting objects (block 212), using eXtensible Stylesheet Language-Formatting Objects (XSL-FO). The XSL-FO file is then converted into a PDF file (block 214), or alternatively, into a Rich Text Format (RTF) file. This PDF file presents the same type of customizable document as shown in FIGS. 1a-c, but can be deployed without the use of a browser (as required by the HTML document configured in block 210). The process ends at terminator block 216. Thus, by drilling down into the XML document, data (which was originally found in the UML model file) can be mined to populate the HTML and/or PDF (or RTF) documents in a format easily understood by the reader. That is, since the documentation shown in FIGS. 1a-c reflects the underlying subject domain rather than the UML syntax, and since the reader/audience understands subject domains, then the reader/audience is able to readily understand the documentation shown in FIGS. 1a-c.

Figure 3:
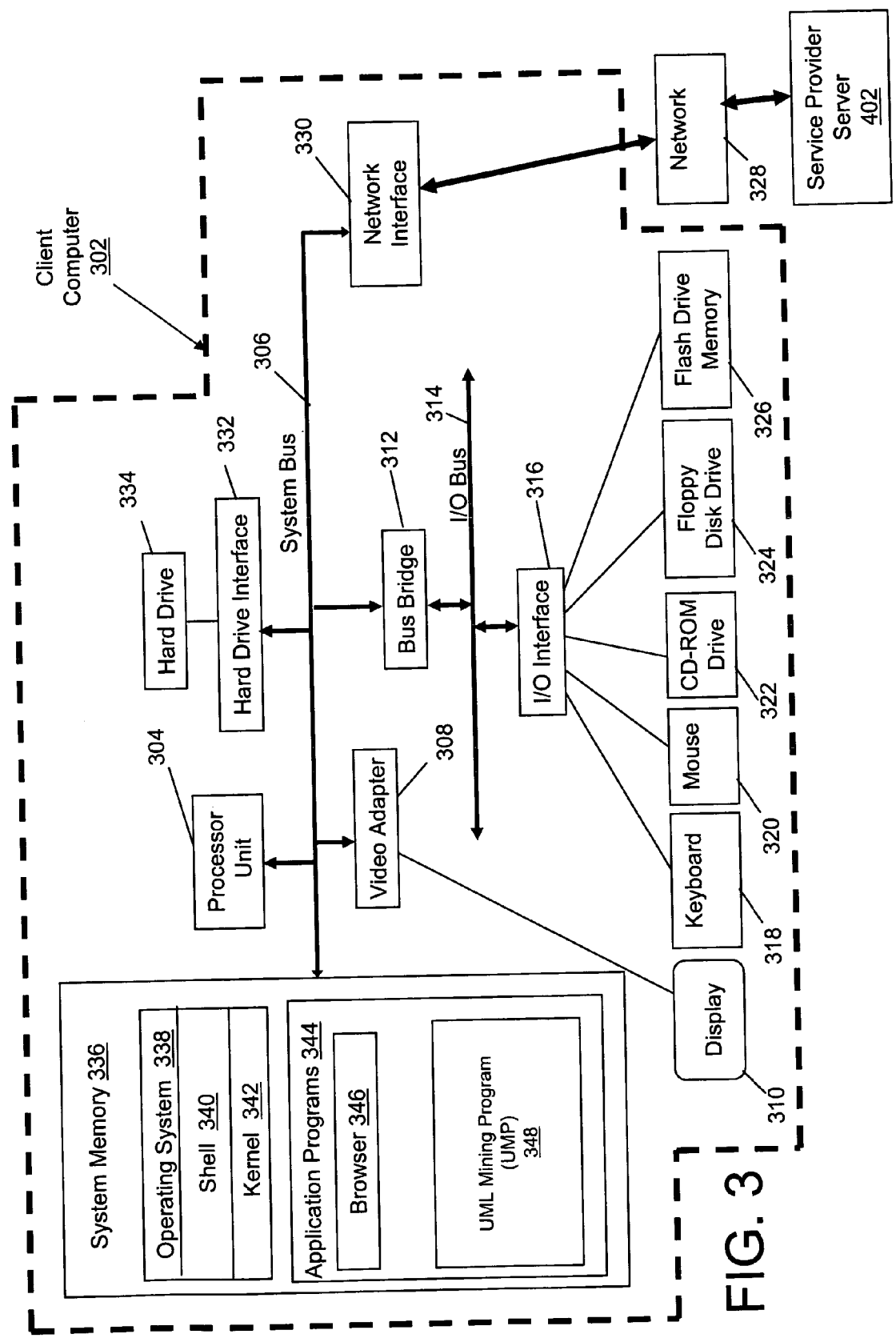
FIG. 3 illustrates an exemplary computer in which the present invention may be implemented.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk—Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a service provider server 402 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with service provider server 402.

Application programs 344 in client computer 302's system memory also include a UML Mining Program (UMP) 348. UMP 348 includes code for implementing the processes described in FIGS. 1-2. In one embodiment, client computer 302 is able to download UMP 348 from service provider server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
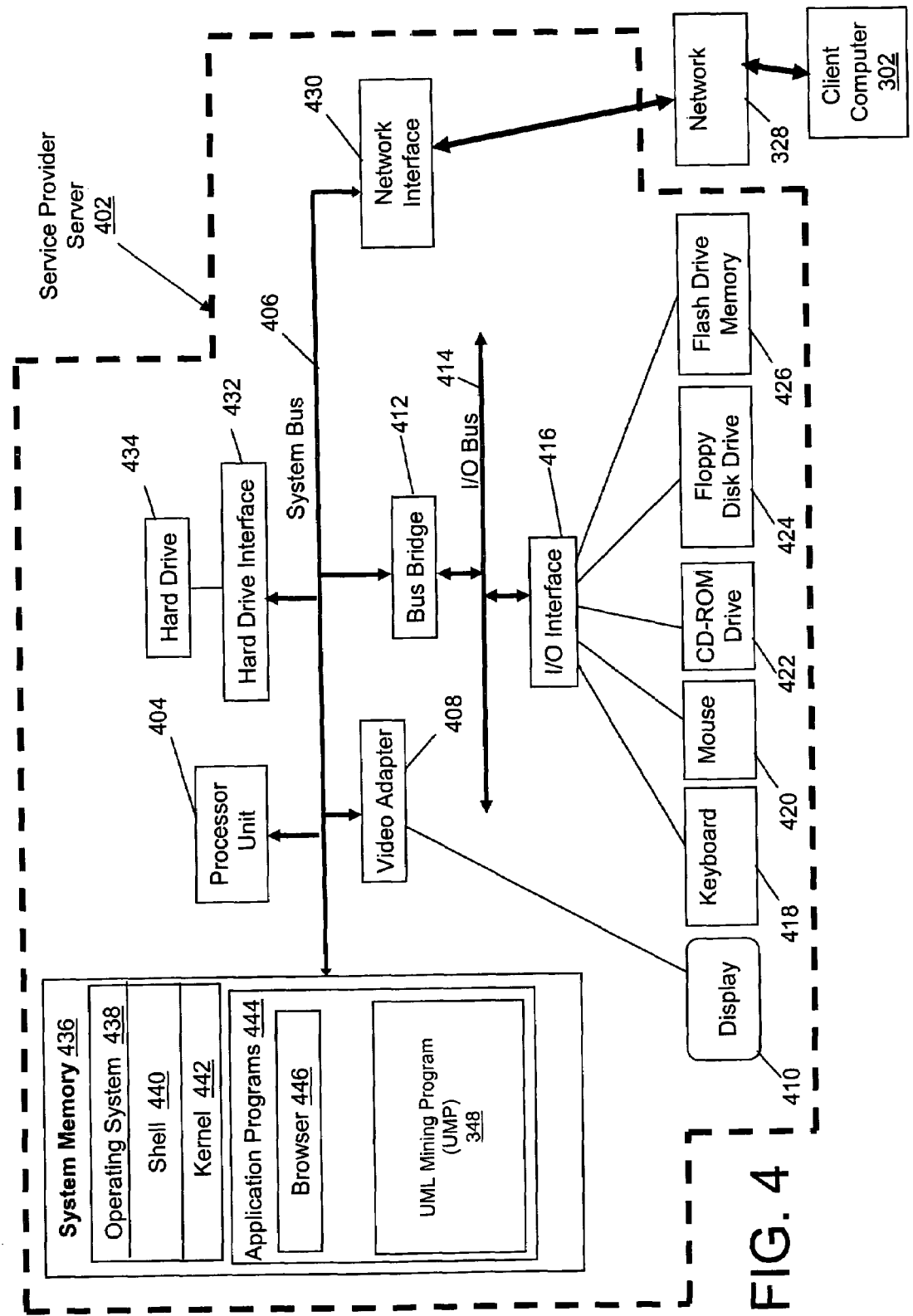
FIG. 4 depicts an exemplary server from which software for executing the present invention may be deployed.

As noted above, UMP 348 can be downloaded to client computer 302 from service provider server 402, shown in exemplary form in FIG. 4. Service provider server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Service provider server 402 is able to communicate with client computer 302 via network 328 using a network interface 430, which is coupled to system bus 406. Access to network 328 allows service provider server 402 to deploy UMP 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes service provider server 402's operating system 438, which includes a shell 440 and a kernel 442. Shell 440 is incorporated in a higher level operating system layer and utilized for providing transparent user access to resources such as application programs 444, which include a browser 446, and a copy of UMP 348 described above, which can be deployed to client computer 302.

The hardware elements depicted in service provider server 402 are not intended to be exhaustive, but rather are representative to highlight essential components required by the present invention. For instance, service provider server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 402 performs all of the functions associated with the present invention (including execution of UMP 348), thus freeing client computer 302 from having to use its own internal computing resources to execute UMP 348.

It should be understood that at least some aspects of the present invention may be implemented in a computer-useable medium that contains a program product. Programs defining functions on the present invention can be delivered to a data storage system or a computer system via a variety of computer-useable storage media, which include, without limitation, non-writable storage media (e.g., CD-ROM) and writable storage media (e.g., hard disk drive, read/write CD ROM, optical media). It should be understood, therefore, that such computer-useable storage media, when encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the process described by the present invention, including the functions of UMP 348, is performed by service provider server 402. Alternatively, UMP 348 and the method described herein, and in particular as shown and described in FIGS. 1-2, can be deployed as a process software from service provider server 402 to client computer 302. Still more particularly, process software for the method so described may be deployed to service provider server 402 by another service provider server (not shown).

Figure 5A:
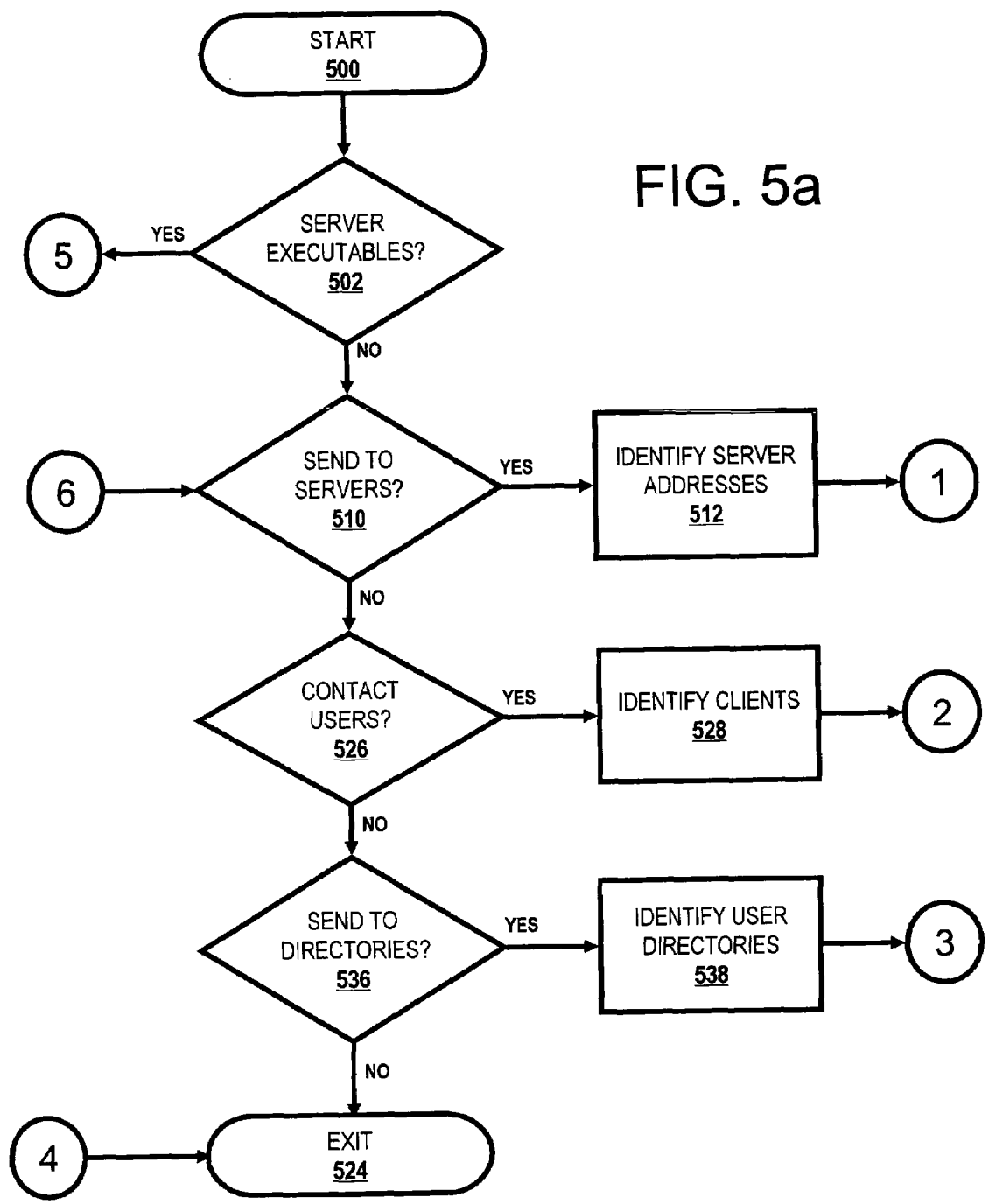
FIGS. 5a-b show a flow-chart of steps taken to deploy software capable of executing the steps shown and described in FIGS. 2a-b.
Figure 5B:
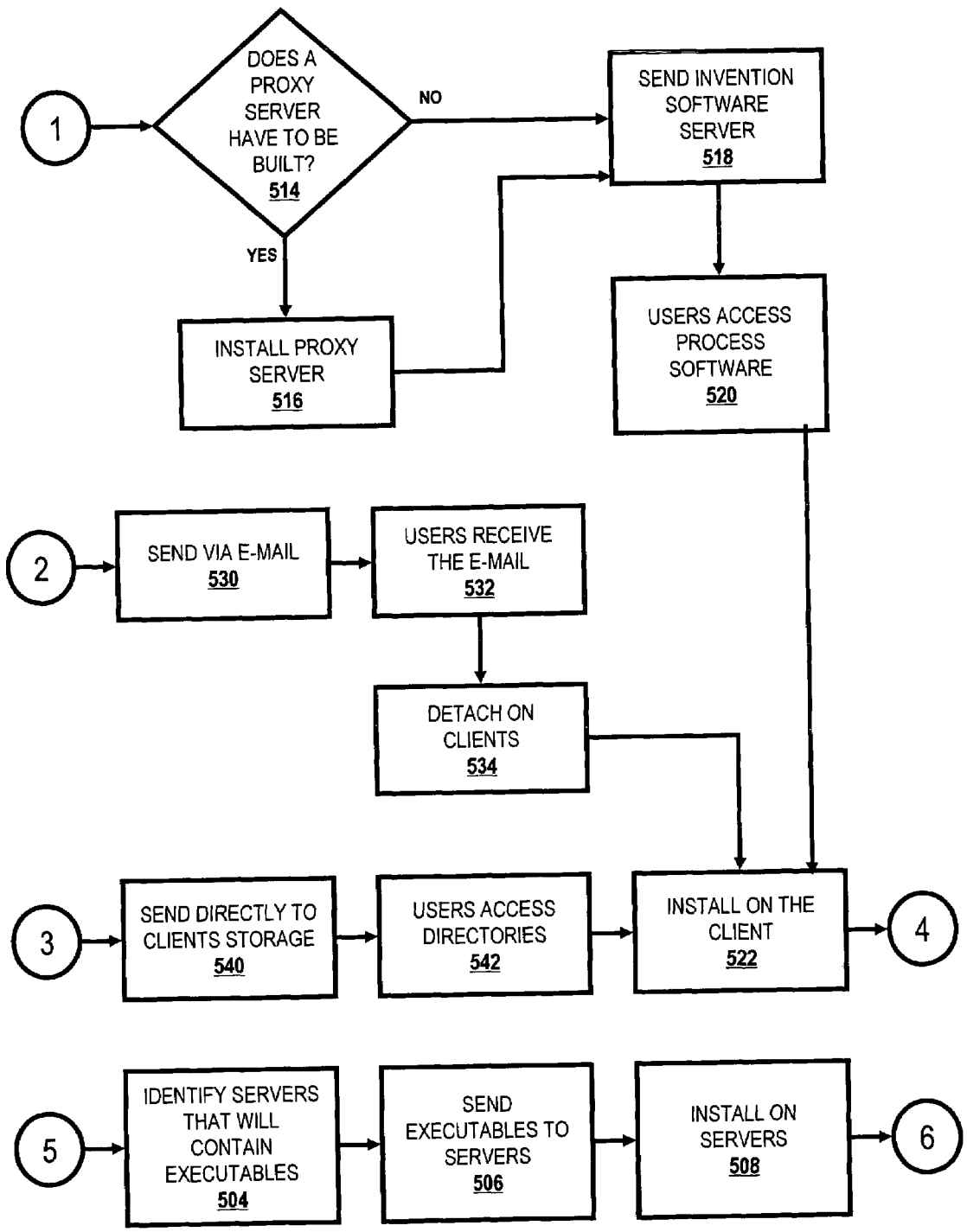

Referring then to FIG. 5, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made on whether to the process software will be sent directly to user directories on their client computers (query block 536). If so, the user directories are identified (block 538). The process software is transferred directly to the user's client computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Figure 6C:
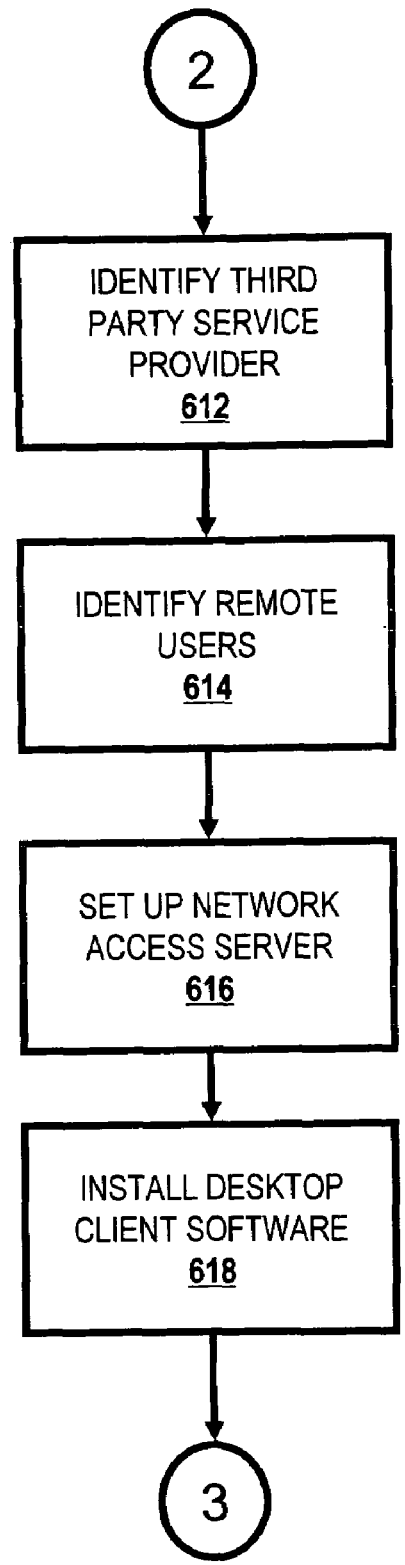

The process for such VPN deployment is described in FIG. 6. Initiator block 602 begins the Virtual Private Network (VPN) process. A determination is made to see if a VPN for remote access is required (query block 604). If it is not required, then proceed to (query block 606). If it is required, then determine if the remote access VPN exists (query block 608).

If a VPN does exist, then proceed to block 610. Otherwise identify a third party provider that will provide the secure, encrypted connections between the company's private network and the company's remote users (block 612). The company's remote users are identified (block 614). The third party provider then sets up a network access server (NAS) (block 616) that allows the remote users to dial a toll free number or attach directly via a broadband modem to access, download and install the desktop client software for the remote-access VPN (block 618).

After the remote access VPN has been built or if it been previously installed, the remote users can access the process software by dialing into the NAS or attaching directly via a cable or DSL modem into the NAS (block 610). This allows entry into the corporate network where the process software is accessed (block 620). The process software is transported to the remote user's desktop over the network via tunneling. That is the process software is divided into packets and each packet including the data and protocol is placed within another packet (block 622). When the process software arrives at the remote user's desk-top, it is removed from the packets, reconstituted and then is executed on the remote users desk-top (block 624).

A determination is then made to see if a VPN for site to site access is required (query block 606). If it is not required, then proceed to exit the process (terminator block 626). Otherwise, determine if the site to site VPN exists (query block 628). If it does exist, then proceed to block 630. Otherwise, install the dedicated equipment required to establish a site to site VPN (block 632). Then build the large scale encryption into the VPN (block 634).

After the site to site VPN has been built or if it had been previously established, the users access the process software via the VPN (block 630). The process software is transported to the site users over the network via tunneling (block 632). That is the process software is divided into packets and each packet including the data and protocol is placed within another packet (block 634). When the process software arrives at the remote user's desktop, it is removed from the packets, reconstituted and is executed on the site users desktop (block 636). The process then ends at terminator block 626.

Software Integration

The process software which includes code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software.

Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7A:
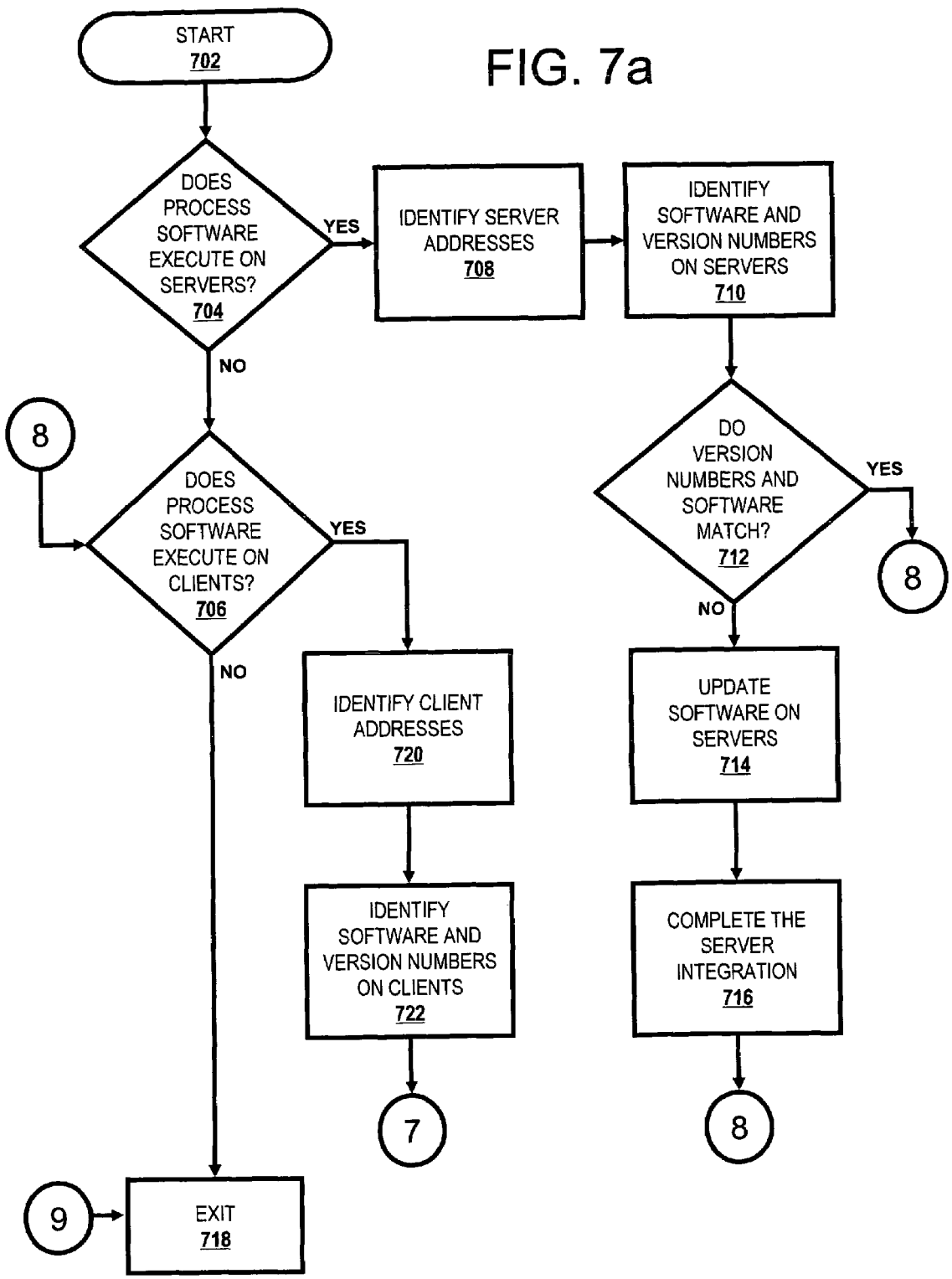
FIGS. 7a-b show a flow-chart showing steps taken to integrate into an computer system software that is capable of executing the steps shown and described in FIGS. 2a-b.
Figure 7B:
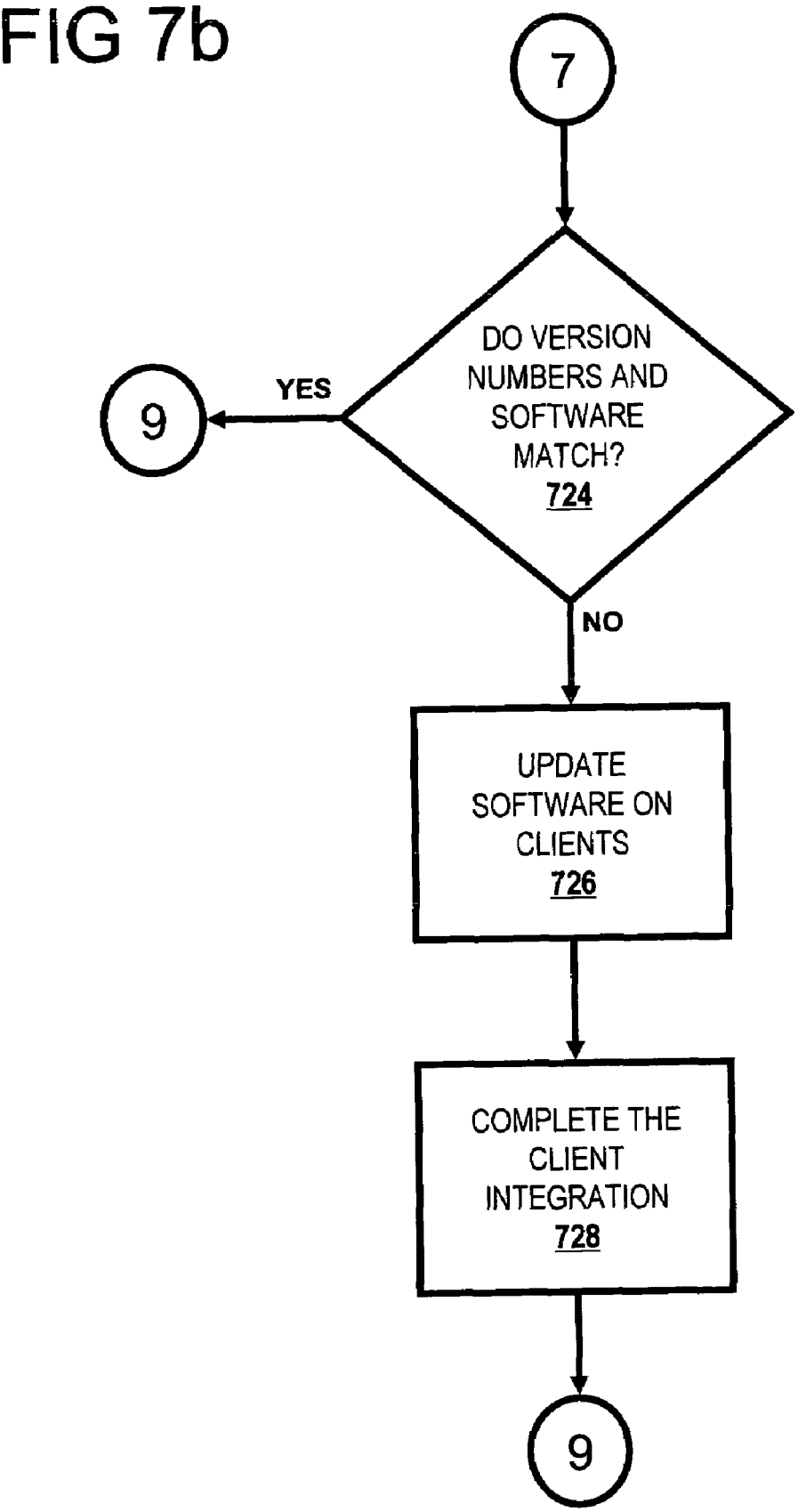

For a high-level description of this process, reference is now made to FIG. 7. Initiator block 702 begins the integration of the process software. The first tiling is to determine if there are any process software programs that will execute on a server or servers (block 704). If this is not the case, then integration proceeds to query block 706. If this is the case, then the server addresses are identified (block 708). The servers are checked to see if they contain software that includes the operating system (OS), applications, and network operating systems (NOS), together with their version numbers, which have been tested with the process software (block 710). The servers are also checked to determine if there is any missing software that is required by the process software in block 710.

A determination is made if the version numbers match the version numbers of OS, applications and NOS that have been tested with the process software (block 712). If all of the versions match and there is no missing required software the integration continues in query block 706.

If one or more of the version numbers do not match, then the unmatched versions are updated on the server or servers with the correct versions (block 714). Additionally, if there is missing required software, then it is updated on the server or servers in the step shown in block 714. The server integration is completed by installing the process software (block 716).

The step shown in query block 706, which follows either the steps shown in block 704, 712 or 716 determines if there are any programs of the process software that will execute on the clients. If no process software programs execute on the clients the integration proceeds to terminator block 718 and exits. If this not the case, then the client addresses are identified as shown in block 720.

The clients are checked to see if they contain software that includes the operating system (OS), applications, and network operating systems (NOS), together with their version numbers, which have been tested with the process software (block 722). The clients are also checked to determine if there is any missing software that is required by the process software in the step described by block 722.

A determination is made if the version numbers match the version numbers of OS, applications and NOS that have been tested with the process software (query block 724). If all of the versions match and there is no missing required software, then the integration proceeds to terminator block 718 and exits.

If one or more of the version numbers do not match, then the unmatched versions are updated on the clients with the correct versions (block 726). In addition, if there is missing required software then it is updated on the clients (also block 726). The client integration is completed by installing the process software on the clients (block 728). The integration proceeds to terminator block 718 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8A:
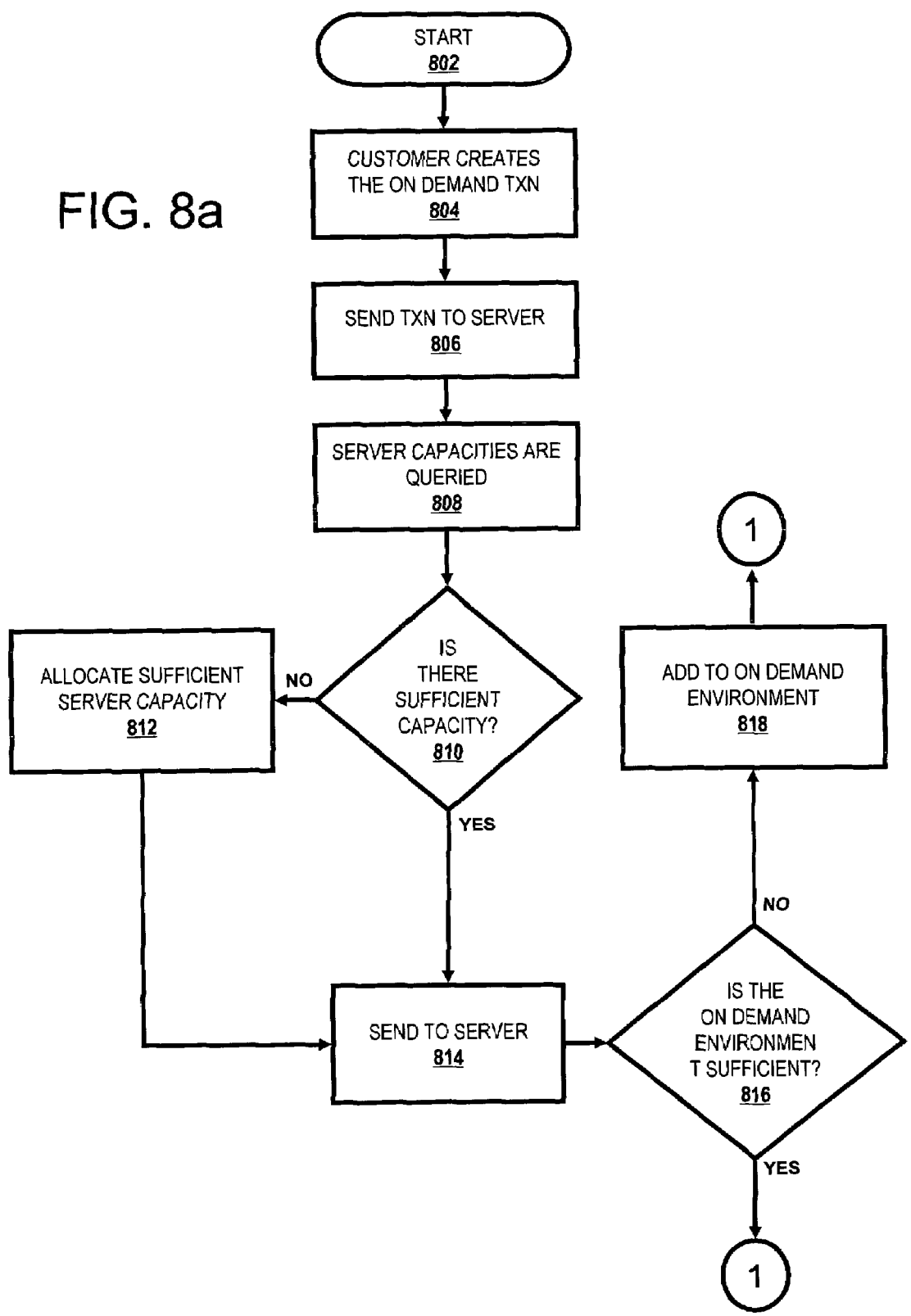
FIGS. 8a-b show a flow-chart showing steps taken to execute the steps shown and described in FIGS. 2a-b using an on-demand service provider.
Figure 8B:
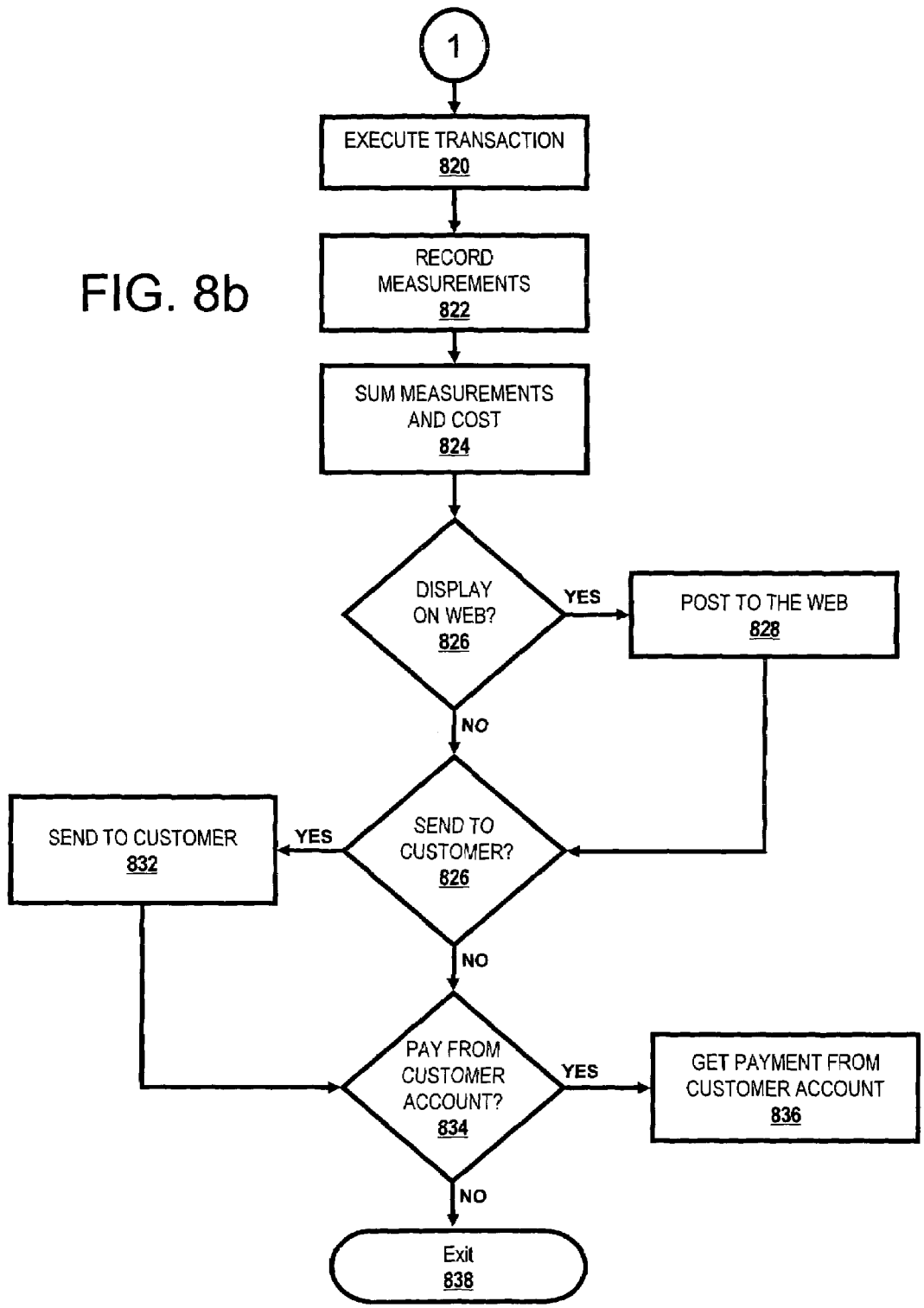

With reference now to FIG. 8, initiator block 802 begins the On Demand process. A transaction is created than contains the unique customer identification, the requested service type and any service parameters that further, specify the type of service (block 804). The transaction is then sent to the main server (block 806). In an On Demand environment the main server can initially be the only server, then as capacity is consumed other servers are added to the On Demand environment.

The server central processing unit (CPU) capacities in the On Demand environment are queried (block 808). The CPU requirement of the transaction is estimated, then the servers available CPU capacity in the On Demand environment are compared to the transaction CPU requirement to see if there is sufficient CPU available capacity in any server to process the transaction (query block 810). If there is not sufficient server CPU available capacity, then additional server CPU capacity is allocated to process the transaction (block 812). If there was already sufficient Available CPU capacity then the transaction is sent to a selected server (block 814).

Before executing the transaction, a check is made of the remaining On Demand environment to determine if the environment has sufficient available capacity for processing the transaction. This environment capacity consists of such things as but not limited to network bandwidth, processor memory, storage etc. (block 816). If there is not sufficient available capacity, then capacity will be added to the On Demand environment (block 818). Next the required software to process the transaction is accessed, loaded into memory, then the transaction is executed (block 820).

The usage measurements are recorded (block 822). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 824).

If the customer has requested that the On Demand costs be posted to a web site (query block 826), then they are posted (block 828). If the customer has requested that the On Demand costs be sent via e-mail to a customer address (query block 830), then these costs are sent to the customer (block 832). If the customer has requested that the On Demand costs be paid directly from a customer account (query block 834), then payment is received directly from the customer account (block 836). The On Demand process is then exited at terminator block 838.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method for mining data from a UML model and displaying underlying subject domain of the UML model in a readily understandable format, the method comprising:

generating a graphics file for a Unified Modeling Language (UML) diagram;

creating an Extensible Markup Language (XML) schema that reflects an underlying subject domain that is to be used when creating an XML representation of a UML model that incorporates relationships described by the UML diagram;

converting the UML model into an XML file in conformance with the XML schema, wherein the XML file comprises XML formatted written descriptions of attributes of elements represented in the UML model;

transforming the XML file into a plurality of HyperText Markup Language (HTML) files, wherein the HTML files include written descriptions of attributes of and relationships among elements represented in the UML model, and wherein at least one of the HTML files references the graphics file; and displaying the HTML files along with the referenced graphics file in a format that reflects the underlying subject domain of the UML model instead of UML syntax.

2. The computer-implementable method of claim 1, wherein the graphics file is a Joint Photographic Experts Group (JPEG) file.

3. The computer-implementable method of claim 1, further comprising:

converting the UML diagram into a browser-compliant graphics file, wherein the browser-compliant graphics file presents a depiction of the UML diagram, and wherein the depiction is incapable of being converted into executable code.

4. The computer-implementable method of claim 1, wherein the relationships among elements in the UML diagram include attributes of the elements in the UML model, operations performed by the elements in the UML model, diagrams included in the UML model, and sources used to identify the UML elements.

5. The computer-implementable method of claim 1, wherein the converting the UML model into an XML file comprises:

creating a report template that iterates through all UML elements in the UML model to create the XML file;

annotating report template tags of the report template with XML tags based on the XML schema;

generating, based on the report template, a report as a word processing document that describes attributes of elements in the UML mode;

processing the report to ensure that the report is well-formed; and pasting the word processing document contents into the XML file.

6. A system for mining data from a UML model and displaying underlying subject domain of the UML model in a readily understandable format, the system comprising:

a processor;

a data bus coupled to the processor;

a memory coupled to the data bus; and a computer-usable medium embodying computer program code, the computer program code comprising instructions executable by the processor and configured to:

generate a graphics file for a Unified Modeling Language (UML) diagram;

create an Extensible Markup Language (XML) schema that reflects an underlying subject domain that is to be used when creating an XML representation of a UML model that incorporates relationships described by the UML diagram;

convert the UML model into an XML file in conformance with the XML schema, wherein the XML file comprises XML formatted written descriptions of attributes of elements represented in the UML mode;

transform the XML file into formatting objects that are used to create a Portable Document Format (PDF) file that references the graphic file, wherein the PDF file includes written descriptions of attributes of and relationships among elements represented in the UML model; and display the PDF file along with the referenced graphics file in a format that reflects the underlying subject domain of the UML model instead of UML syntax.

7. The system of claim 6, wherein the computer program code further comprises instructions executable by the processor and configured to:
  convert the UML diagram into a graphics file, wherein the graphics file presents a graphical depiction of the UML diagram, and wherein the depiction is incapable of being converted into executable code.

8. The system of claim 6, wherein the relationships among elements in the UML diagram include attributes of the elements in the UML model, operations performed by the elements in the UML model, diagrams included in the UML model, and sources used to identify the UML elements.

9. The system of claim 6, wherein the instructions that convert the UML mode into an XML file comprise instructions that when executed by the processor cause the processor to:
  create a report template that iterates through all UML elements in the UML model;
  annotate report template tags of the report template with XML tags based on the XML schema;
  generate, based on the report template, a report as a word processing document that describes attributes of elements in the UML model;
  process the report to ensure that the report is well-formed; and
  paste the word processing document into the XML file.

10. A computer-usable medium embodying computer program code for mining data from a UML model and displaying underlying subject domain of the UML model in a readily understandable format, the computer program code comprising computer executable instructions configured to:
  generate a graphics file for a Unified Modeling Language (UML) diagram;
  create an Extensible Markup Language (XML) schema that reflects an underlying subject domain that is to be used when creating an XML representation of a UML model that incorporates relationships described by the UML diagram;
  convert the UML model into an XML file in conformance with the XML schema, wherein the XML file comprises XML formatted written descriptions of attributes of elements represented in the UML model;
  transform the XML file into a plurality of HyperText Markup Language (HTML) files, wherein the HTML files include written descriptions of attributes of and relationships among elements represented in the UML model, and wherein at least one of the HTML files reference the graphics file and the computer-usable medium is a computer-usable storage medium; and
  display the HTML files along with the referenced graphics file in a format that reflects the underlying subject domain of the UML model instead of UML syntax.

11. The computer useable medium of claim 10, wherein the computer program code further comprises computer executable instructions configured to:
  convert the UML model into a browser-compliant graphics file, wherein the browser-compliant graphics file presents a graphical depiction of the UML model, and wherein the graphical depiction is incapable of being converted into executable code.

12. The computer-usable medium of claim 10, wherein the relationships among elements in the UML model include attributes of the elements in the UML model, operations performed by the elements in the UML model, diagrams supported by the UML model, and sources used to identify the UML elements.

13. The computer-usable medium of claim 10, wherein the computer executable instructions that convert the UML model into an XML file further comprises computer executable instructions for:
  creating a report template that iterates through all UML elements in the UML model to create the XML file;
  annotating report template tags of the report template with XML tags based on the XML schema;
  generating, based on the report template, a report as a word processing document that describes attributes of elements in the UML model file;
  processing the report to ensure that the XML file is well-formed; and
  transforming the word processing document into an XML text file.

14. The computer-useable medium of claim 10, wherein the computer program code is deployed to a client computer from a server at a remote location.

15. The computer-useable medium of claim 10, wherein the computer program code is provided by a service provider to a customer on an on-demand basis.

* * * * *